(12) United States Patent
Garcia et al.

(10) Patent No.: US 11,745,827 B2
(45) Date of Patent: Sep. 5, 2023

(54) BICYCLE REAR DERAILLEUR DEVICE

(71) Applicant: ROTOR COMPONENTES TECNOLOGICOS, S.L., Madrid (ES)

(72) Inventors: David Martinez Garcia, Madrid (ES); Pablo Carrasco Vergara, Madrid (ES); Carlos Miguel Carton Cordero, Madrid (ES); Angelica Del Rio Garcia, Madrid (ES)

(73) Assignee: Rotor Componentes Tecnologicos, S.L., Madrid (ES)

( * ) Notice: Subject to any disclaimer, the term of this patent is extended or adjusted under 35 U.S.C. 154(b) by 511 days.

(21) Appl. No.: 17/044,355

(22) PCT Filed: Apr. 2, 2019

(86) PCT No.: PCT/EP2019/025095
§ 371 (c)(1),
(2) Date: Oct. 1, 2020

(87) PCT Pub. No.: WO2019/197058
PCT Pub. Date: Oct. 17, 2019

(65) Prior Publication Data
US 2021/0070396 A1 Mar. 11, 2021

(30) Foreign Application Priority Data

Apr. 9, 2018 (ES) ................ ES201830352

(51) Int. Cl.
*B62M 9/126* (2010.01)
*B62M 9/125* (2010.01)
*B62M 9/16* (2006.01)

(52) U.S. Cl.
CPC ............ *B62M 9/126* (2013.01); *B62M 9/125* (2013.01); *B62M 9/16* (2013.01)

(58) Field of Classification Search
CPC ...... B62M 9/126; B62M 9/16; B62M 9/1248; B62M 9/1242; B62M 9/121; B62M 9/1244; B62M 9/125
(Continued)

(56) References Cited

U.S. PATENT DOCUMENTS 3,677,103 A * 7/1972 Huret ................. B62M 9/16
474/134
3,702,080 A * 11/1972 Huret .................. B62M 9/126
474/134
(Continued)

FOREIGN PATENT DOCUMENTS

| CN | 103832535 | 3/2013 |
| EP | 1902936 | 4/2007 |
| EP | 2594473 B1 | 10/2012 |

*Primary Examiner* — Henry Y Liu
(74) *Attorney, Agent, or Firm* — Bay State IP, LLC

(57) ABSTRACT

Bicycle rear derailleur device (1) comprising a chain guide assembly (15) made up of two parts: a guiding cage (28) and a tension cage (32). It also comprises a movable member (18) coupled to a base member (10) via a linking member (13) to align the chain guide assembly (15) with the different sprockets. Said tension cage (32) carries a tension pulley (11), is pivotably coupled to the movable member (18) and is biased by a main spring or biasing member (17). The guiding cage (28) carrying a guiding pulley (14), and the tension cage (32) are both configured to move either jointly or independently of each other, such the distance between both pulleys (14, 11) is fixed or free respectively, varying as a consequence the chain tension. To do so, the guiding cage (28) is pivotally coupled to the tension cage (32) comprising between them coupling means (16) that selectively and reversibly make both cages united or not.

14 Claims, 11 Drawing Sheets

(58) Field of Classification Search
USPC .......................................... 474/80, 82, 134
See application file for complete search history.

(56) References Cited

U.S. PATENT DOCUMENTS

| | | | | |
|---|---|---|---|---|
| 4,226,131 | A * | 10/1980 | Yamasaki | B62M 9/126 474/134 |
| 4,637,808 | A * | 1/1987 | Nakamura | B62M 9/126 474/80 |
| 5,213,549 | A * | 5/1993 | Blanchard | B62M 9/16 474/81 |
| 6,159,118 | A * | 12/2000 | Campbell | B62M 9/1248 474/78 |
| 6,793,598 | B1 * | 9/2004 | Savard | B62M 9/1248 474/81 |
| 7,722,488 | B2 * | 5/2010 | Kunisawa | B62M 9/121 474/82 |
| 8,277,346 | B2 * | 10/2012 | Watarai | B62M 9/1242 474/82 |
| 8,852,041 | B2 * | 10/2014 | Yamaguchi | B62M 9/126 474/80 |
| 8,882,618 | B2 * | 11/2014 | Yamaguchi | B62M 25/08 474/82 |
| 9,039,551 | B2 * | 5/2015 | Bohm | B62M 9/1244 474/82 |
| 9,475,547 | B2 * | 10/2016 | Jordan | B62M 9/1248 |
| 9,511,820 | B2 * | 12/2016 | Watarai | B62M 9/1242 |
| 9,751,590 | B2 * | 9/2017 | Shipman | B62M 9/1248 |
| 10,011,325 | B2 * | 7/2018 | Zawistowski | B62M 9/122 |
| 2004/0106482 | A1 * | 6/2004 | Nagano | B62M 9/1242 474/82 |
| 2007/0202978 | A1 * | 8/2007 | Yamaguchi | B62M 9/126 474/82 |
| 2008/0064545 | A1 * | 3/2008 | Yamaguchi | B62M 9/126 474/82 |
| 2008/0081716 | A1 * | 4/2008 | Watarai | B62M 9/125 474/80 |

* cited by examiner

FIG. 4
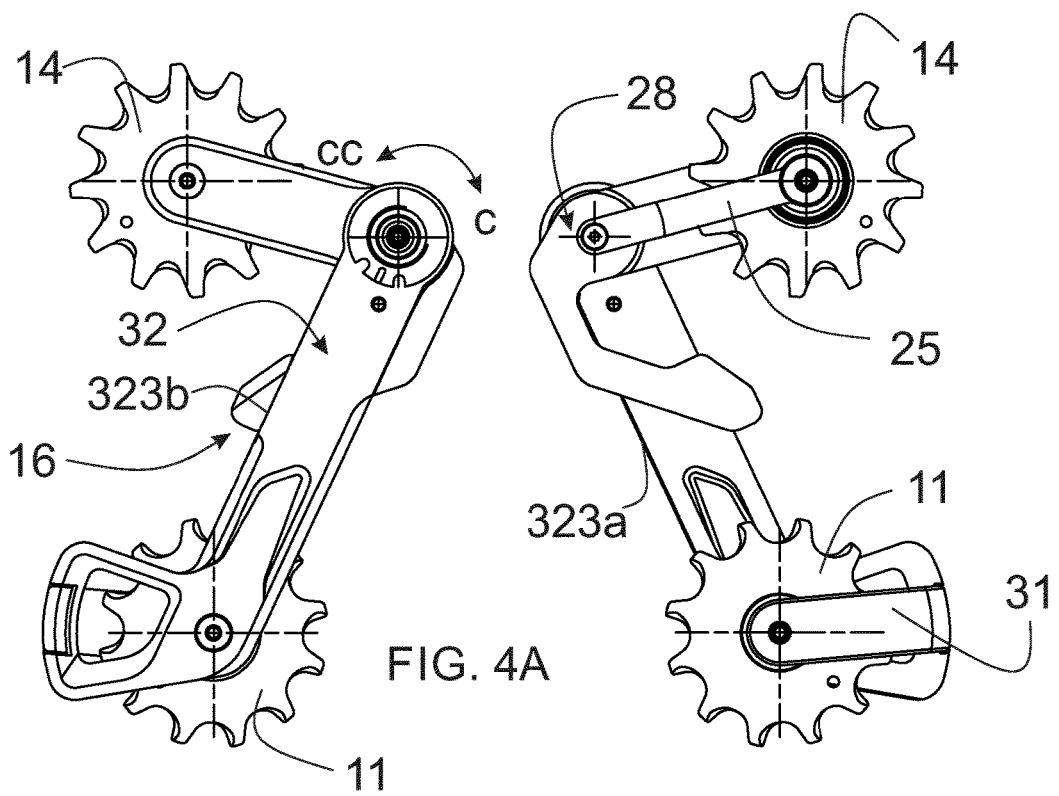
FIG. 4A
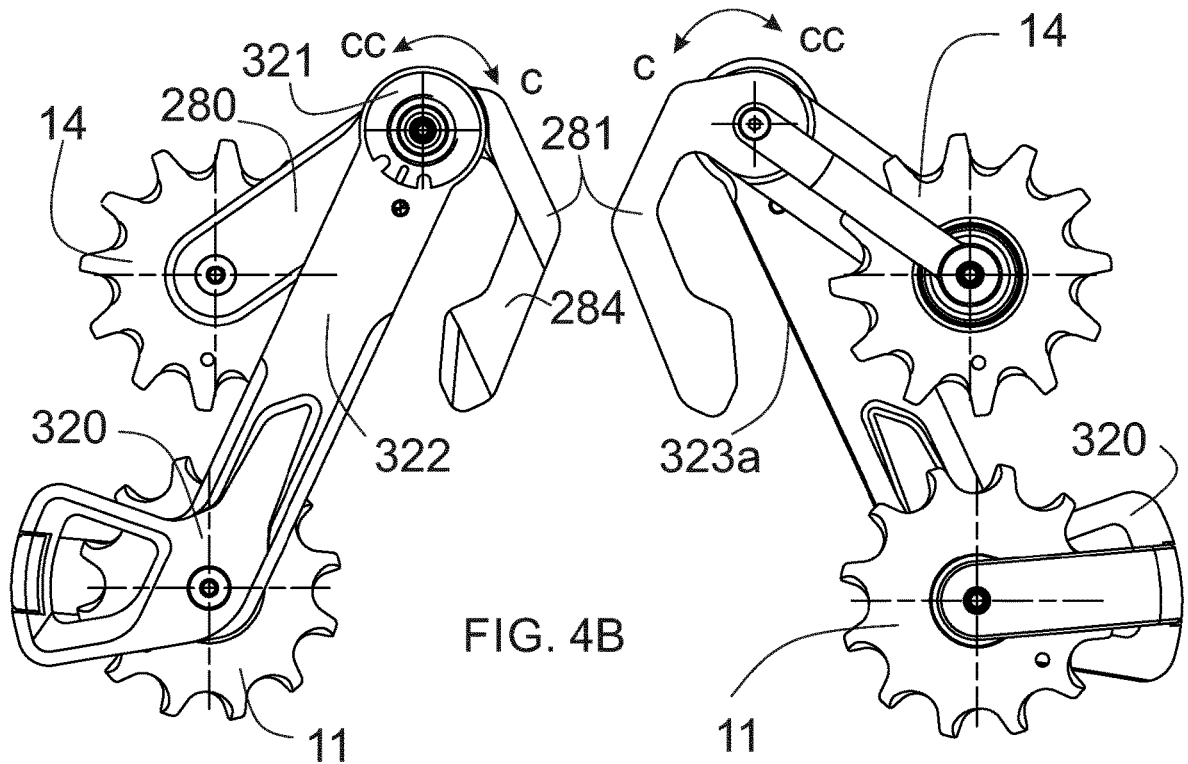
FIG. 4B

FIG. 5
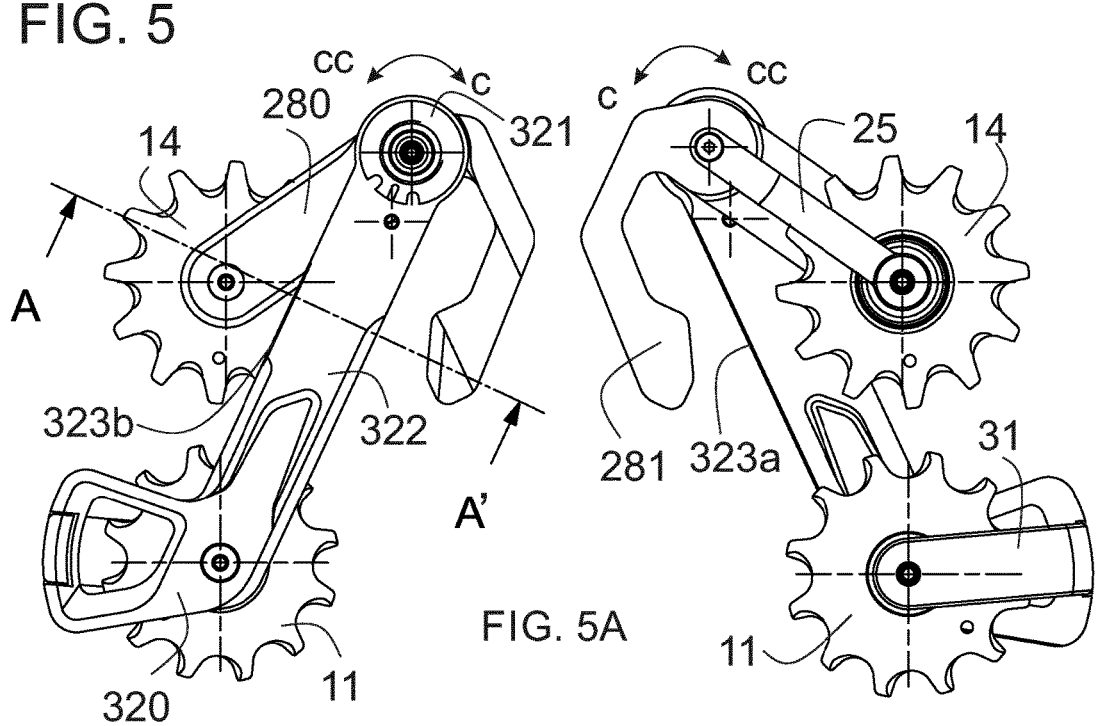
FIG. 5A
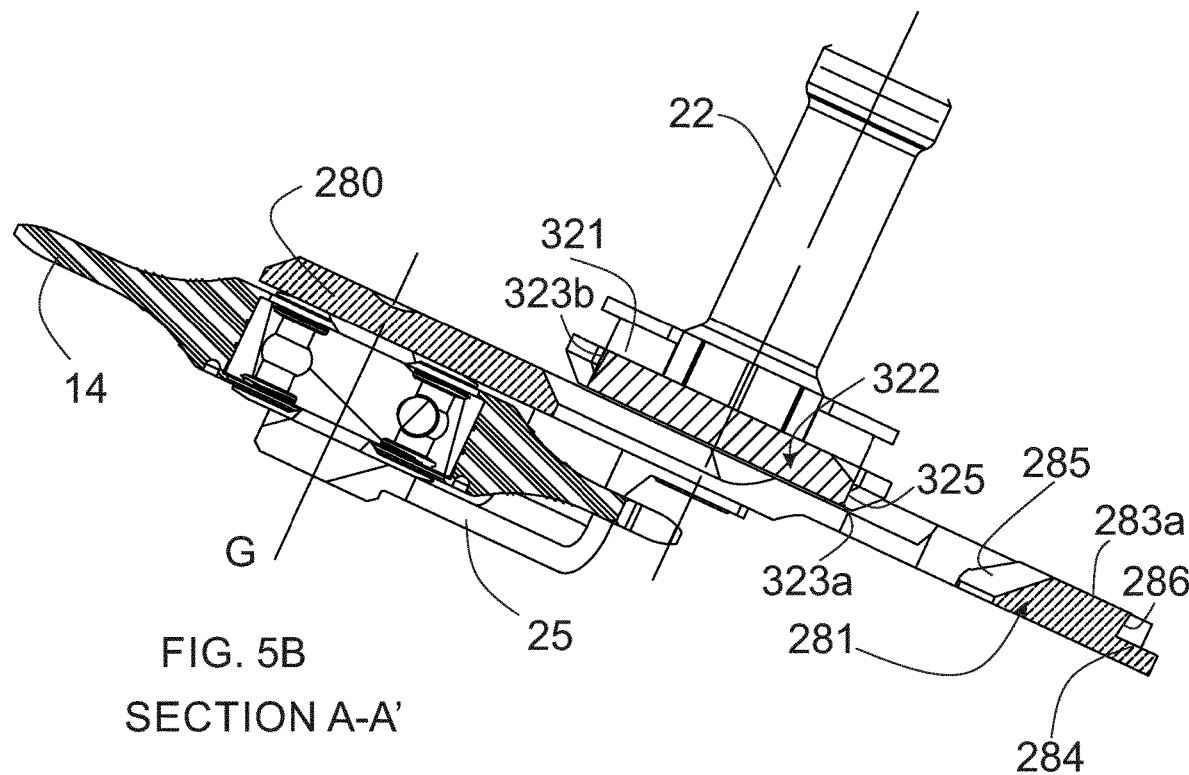
FIG. 5B
SECTION A-A'

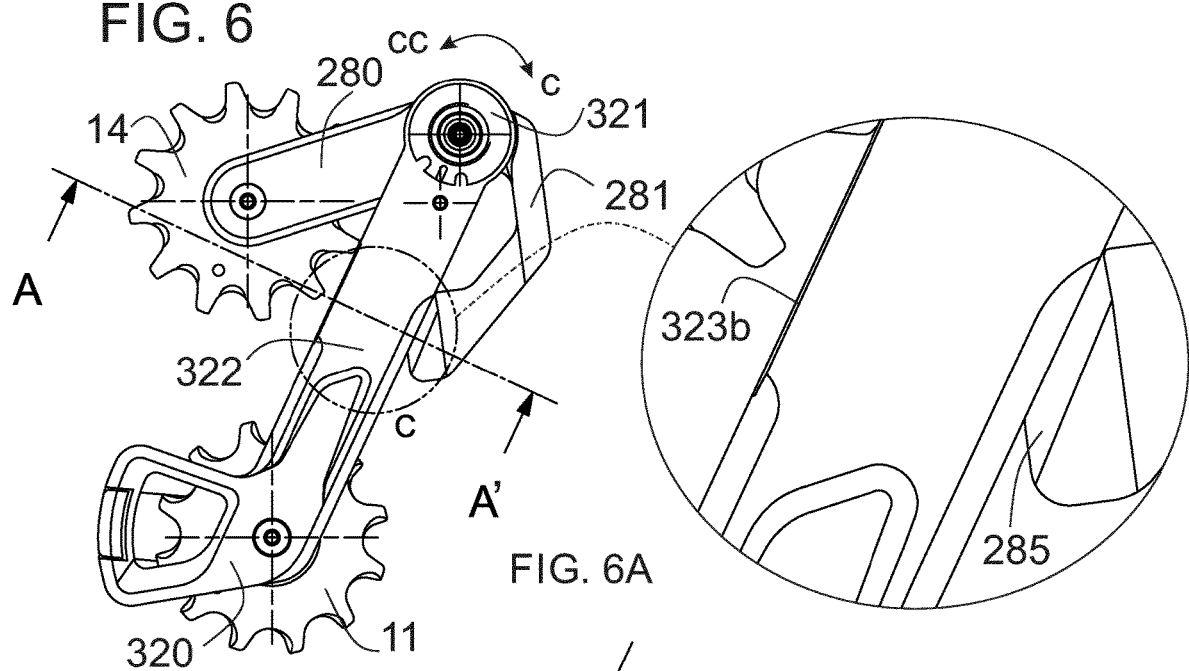
FIG. 6
FIG. 6A
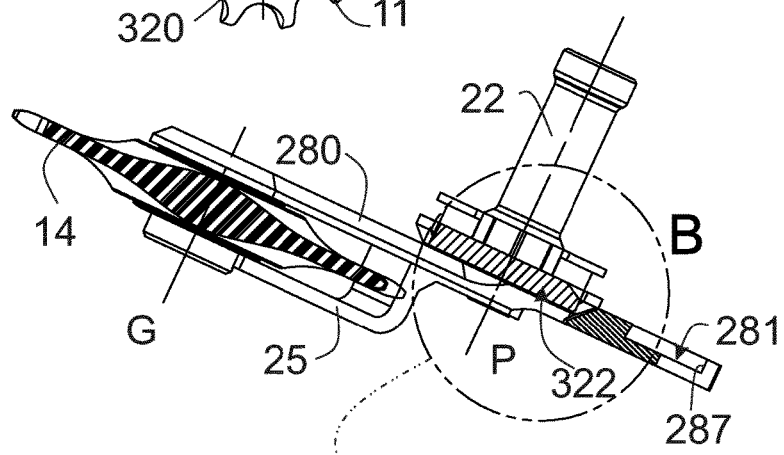
FIG. 6B
SECTION A-A'
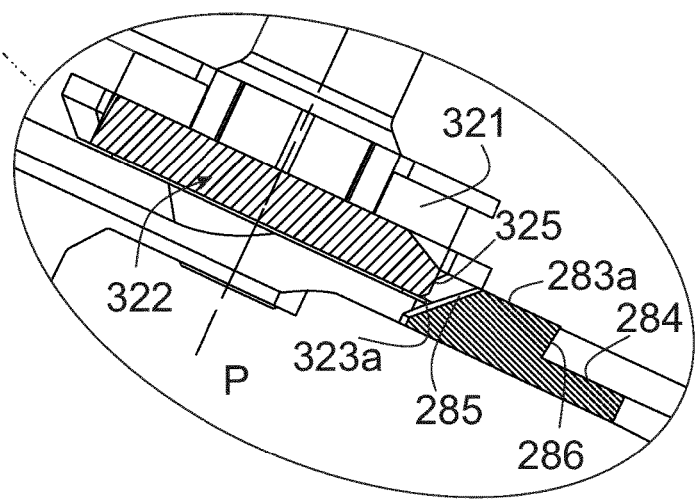

SECTION A-A'

SECTION B-B

BICYCLE REAR DERAILLEUR DEVICE

The present invention relates to a shifting gear system, particularly, to a bicycle rear derailleur provided with a pulley cage to guide the chain, using a spring for keeping the transmission chain in tension. In addition, said pulley cage includes a reversible device which reduces the tension in the chain, thus facilitating maintenance operations.

PRIOR ART

Bicycle gearshift assemblies widely spread in the sector comprise a plurality of sprockets mounted on the bicycle rear wheel shaft. The chain is engaged to one or another sprocket depending on the selected gear, using a rear derailleur. This rear derailleur includes a chain guide assembly, or pulley cage, which moves the chain laterally causing the chain engagement shifts between different sprockets. The chain guide assembly typically includes chain guide plates supporting two toothed pulley wheels, usually referred as guide pulley and tension pulley, and a pivot shaft which pivotally connects said chain guide assembly to a movable member of the derailleur. This pivot shaft is provided with a main spring that forces said chain guide assembly in a predetermined direction relative to the pivot shaft, thus maintaining the chain always in tension in operating conditions.

Maintaining operations performed very often requires the assembly and disassembly of the rear wheel, as in wheel punctures, wheel repair, wheel change, or when the bicycle changes from a transport or storage state to a working state. In these operations, placing the rear wheel shaft in the rear fork of the frame involves certain difficulties, due in part to the geometric interferences between the elements of the chain guide assembly, the chain and the sprockets. These interferences get worse in specific orientations of the chain gear engagement as the chain is tensioned by the force exerted by the main spring. This problem when mounting the rear wheel on the bicycle is even greater in the widespread case of wheels equipped with disc brakes. During the extraction of the rear wheel, when the set of sprockets coupled to the rear wheel, is displaced out of its working position, the cassette or sprocket assembly hits the derailleur. This collision happens because the rear derailleur, although it is an element constructed capable to swing backwards in relation to the frame for separating from that extraction trajectory, is also biased by the chain tension not to do so. Therefore, the user is obligated to manually force the rear derailleur position to avoid interferences, moving it away from the extraction trajectory of the rear wheel, applying the required force to counteract the tension of the chain. In the opposite operation, when the rear wheel is reassembled, the same interference problem occurs when the chain is tensioned again. These operations usually require certain skill level of the user, and in some cases, it also requires another person helping or placing the bicycle on a workstand which is not usually available in race.

Solutions to this problem are shown in the closest prior art, citing for example the document Sram EP2594473B1 which shows a chain guide assembly coupled to the movable member and provided with a manual locking device using a pin element sliding between two different positions, thus allowing the chain guide adopts both positions: a passive position in which the chain guide is held in a locked position, and an active position in which the pin releases the chain guide with respect to the movable member, so the chain guide is once again forced by the main spring. A similar solution to that, is the one disclosed in the document Qian Haize CN103832535.

We can also consider Shimano EP1902936 as a close document showing a rear derailleur bicycle that has a mounting structure on the base member, which can be locked in a position corresponding to the wheel releasing, thus retaining this base member selectively and reversibly in said position. To do this, there is a fixing member that joins the bike, and a pin-shaped locking member, located between the fixing member and the base member, so that this base member can move defining 2 different positions, one derailleur working position and another releasing position of the rear wheel.

The above described solutions consist in providing a blocking device that carries the whole chain guide assembly from a working position to a passive position, blocking said chain guide in a state that facilitates the assembly of the rear wheel in the frame of the bicycle. All these solutions are based on overloading the main spring to bring the chain guide assembly to said locking position, so that none of its components interfere with the rear wheel path for its disassembly, particularly the guiding pulley which is usually the most interfering during the assembly and disassembly operations of the rear wheel.

Another nearby document is Shimano US20040106482 which discloses a rear derailleur, with a chain guide assembly comprising two independent chain cage arms: the tension arm, biased by the main spring, and the guiding arm which can pivot freely between two extreme positions regarding a rotation axis different from the main pivot axis corresponding to the tension arm; and being both chain cage arms configured and arranged to move independently from each other. However, this device lacks a selective locking mechanism allowing the selection at the user's will between an active working mode and a passive maintenance mode, as in the case of the previous documents.

Unlike the prior art, the present invention provides a different solution to the problem, acting on the geometry of the chain guide assembly and consequently varying the tension in the chain, instead of acting on the main spring. Furthermore, the lifespan of the main spring is extended, by not acting on it, overloading and unloading.

In addition, there is an aggravating factor to the stated technical problem, particularly for cycling in rough terrain. Due to the bumps, the chain forces the chain guide assembly to rotate in the opposite direction to the chain tensioning, causing continuous blows between the chain and the bicycle chain stay, and also generating undesirable slack in the chain that eventually cause its disengagement. To prevent this from happening, currently the use of rear derailleurs equipped with a clutch element has become common used, basically consisting of a unidirectional brake that restrains or dampens said movement of the chain cage, commonly using a one way bearing whose inner race is united with the chain cage, and the outer race is braked with respect to the movable member using any well-known device, such as a metal band embracing it, as in the case of Shimano U.S. Pat. No. 8,882,618B2.

Thus, in the case of a rear derailleur provided with a clutch, but not provided with a mechanism that allows switching between an active working mode and a passive mode for maintenance, the assembly and disassembly of the rear wheel becomes practically unfeasible, because the clutch has increased the force needed to move the chain cage. Therefore, particularly in the case of the current rear gears equipped with clutch mechanisms, it is necessary a device that eliminates the geometric interferences between the elements involved, achieving an advantageous configuration particularly for maintenance operations.

SUMMARY

The present invention provides a device for a bicycle rear derailleur comprising clutch mechanism, that without affecting the derailleur general function enables an easy accessibility for maintenance operations, especially the assembly and disassembly of the bicycle rear wheel. The present invention solves the technical problem described above with the following means.

A first aspect of the present invention is a bicycle rear derailleur that includes a chain guide assembly comprising two chain cages, a tension cage and a guiding cage. In addition, it comprises a movable member coupled to a base member via a linking member aligning the chain guide assembly with the different sprockets. The tension cage carries a tension pulley, and is pivotably coupled to the movable member, being biased by a main spring or biasing member. The guiding cage, which carries a guiding pulley, and the tension cage are both configured to move either united or independently of each other, being the distance between the guiding pulley and the tension pulley respectively fixed or free, thus varying as a consequence the chain tension. To do so, the guiding cage is pivotally coupled to the tension cage, comprising between them coupling means that selectively and reversibly make the two chain cages united or not. These reversible coupling means allows the removal of the guiding pulley from the rear wheel path when disassembling of the frame, thus eliminating the interference and allowing in turn a chain slackening that also facilitates this maintenance operation.

A second aspect of the present invention is a bicycle rear derailleur provided with a clutch mechanism. Being this clutch mechanism, a unidirectional resistance device arranged between the movable member and the chain guide assembly, to restrict the relative rotation between them exclusively in one of the rotation directions, usually the opposite direction to the pedalling direction that corresponds to the loading direction of the main spring. Said unidirectional resistance mechanism comprises a resistant member, which brakes the rotation of a friction member united with the chain guide assembly, when the latter rotates in the opposite to the pedalling direction. Said resistant member preferably consists of a wound wire forming coils around said friction member, and it has one of its ends free and the other end fixed on the movable member. Said friction member is preferably configured as a shaft arranged united with the chain guide assembly. In this way, when the friction member rotates in the winding direction of the wire, it engages on said friction member increasing the rotation resistance, while in the opposite direction of rotation the coils open and release the friction member so that it rotates freely.

Thus, due to the embodiment of the clutch mechanism in the present invention, additional advantages are added to the conventional clutch mechanisms of the Prior Art, as the resulting mechanism becomes less complex, by eliminating the use of the unidirectional bearing ("one way bearing"), as well as reducing cost, weight and volume of the whole.

In addition, a consequence of this configuration is that at the beginning of the chain guide rotation in its braked direction, while said wire has just embraced the friction member, it happens a little path travelled by the chain guide member with no effective braking, which makes our clutch mechanism different from those widely used in the market that use a one-way bearing. This different behaviour makes our unidirectional resistance mechanism mainly advantageous in the specific case of using oval chainrings in the bicycle, because during pedalling, due to the chainring geometry, the tension cage releases and picks up the chain twice per cycle, causing a slight back and forth movement of the chain guide assembly. This oscillation causes an overstrain in the rear derailleurs provided with conventional clutch mechanisms, due to their immediate response capability in forcing the chain guide assembly to stop its displacement in one direction, which does not happen in the proposed clutch mechanism.

BRIEF DESCRIPTION OF THE FIGURES

FIG. 4 shows two different relative positions of the assembly formed by the tension cage (32) and the guiding cage (28): a working mode (FIG. 4A) in which both chain cages are engaged and they move jointly thus causing a working load in the bicycle chain (not shown); and a maintenance mode (FIG. 4B) in which both chain cages are disengaged and move independently, causing both pulleys to come closer and the chain tension decreases. It is also shown the rotation directions (C) and (CC) of the guiding cage (28) when pivoting to engage and disengage from the tension cage (32), which respectively produces the tensioning and slackening of the chain.

FIG. 5A shows the maintenance mode shown in FIG. 4B when the tension cage (32) and the guiding cage (28) are completely disengaged and move independently. FIG. 5B shows section A-A' of FIG. 5A, disclosing the elements that participate in the coupling between both cages.

FIG. 6A shows the beginning of the coupling operation when the assembly changes from the maintenance mode shown in FIG. 4B, to the working mode shown in FIG. 4A wherein the tension cage (32) and the guiding cage (28) will be engaged and will move jointly. FIG. 6B shows section A-A' of FIG. 6A, disclosing the beginning of the contact between both chain cages, which happens when the guiding cage (28) has been intentionally rotated in the clockwise direction C until the hook member (281) comes into contact with the receiving member (322).

DETAILED DESCRIPTION OF THE PREFERRED EMBODIMENT

Figure 1:
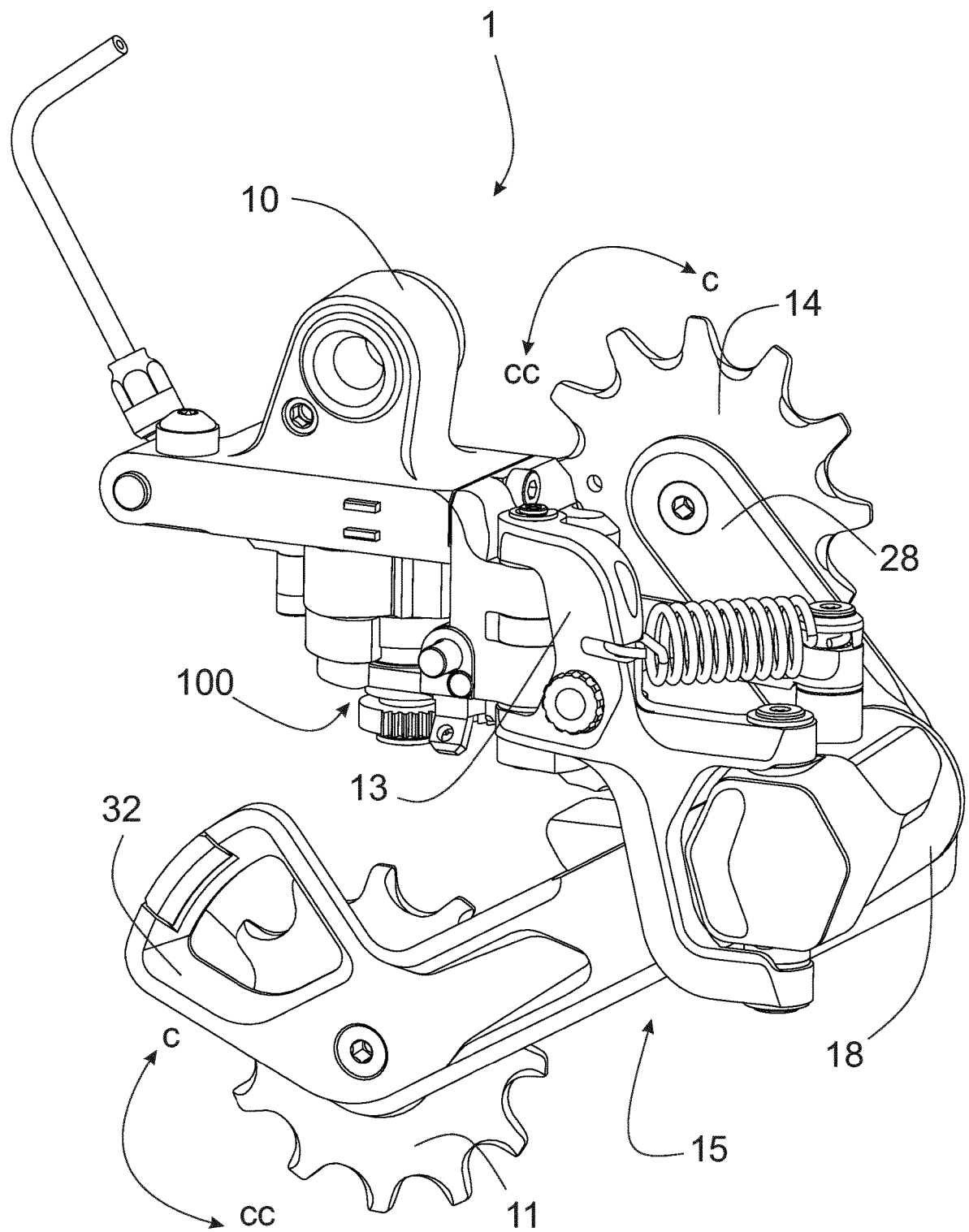
FIG. 1 shows a view of a bicycle rear derailleur device (1) arranged in its working mode with its main elements: a base member (10), a movable member (18), an indexer or positioner mechanism (100) for the movable member (18), a linking member (13) connecting the base member (10) with the movable member (18) and a chain guide assembly (15) made up of two parts: a guiding cage (28) provided with a guiding pulley (14) and a tension cage (32) provided with a tension pulley (11). It is also shown the selected rotation directions for both chain cages (32, 28) in relation to the movable member (18), namely, the pedalling direction corresponding to the clockwise rotation (C) and the opposite to the pedalling direction, counter clockwise (CC).
Figure 2:
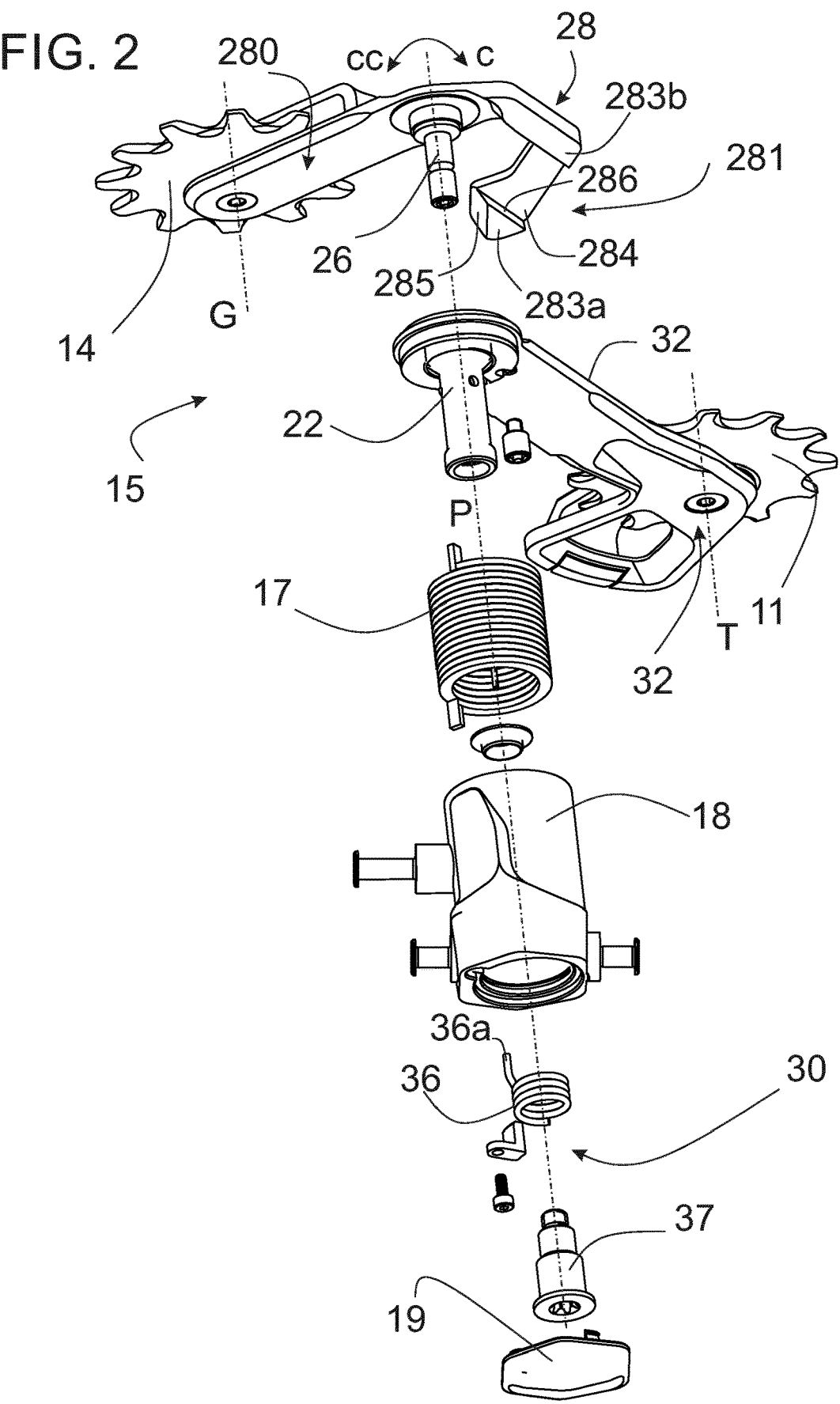
FIG. 2 shows an exploded partial view of the bicycle rear derailleur device (1) of FIG. 1, disclosing the biasing member (17) and the unidirectional resistance mechanism (30) comprising a friction member (37) and a resistance member (36). In this preferred embodiment with a pivoting joint between the guiding cage (28) and the tension cage (32), it is also shown the main rotational axis of the assembly: the tension pulley rotational axis (T), the guiding pulley rotational axis (G) and the pivot axis (P), as well as the rotation directions (CC) and (C), corresponding respectively to the loading and unloading of the biasing member (17) in the working mode of the assembly.
Figure 3:
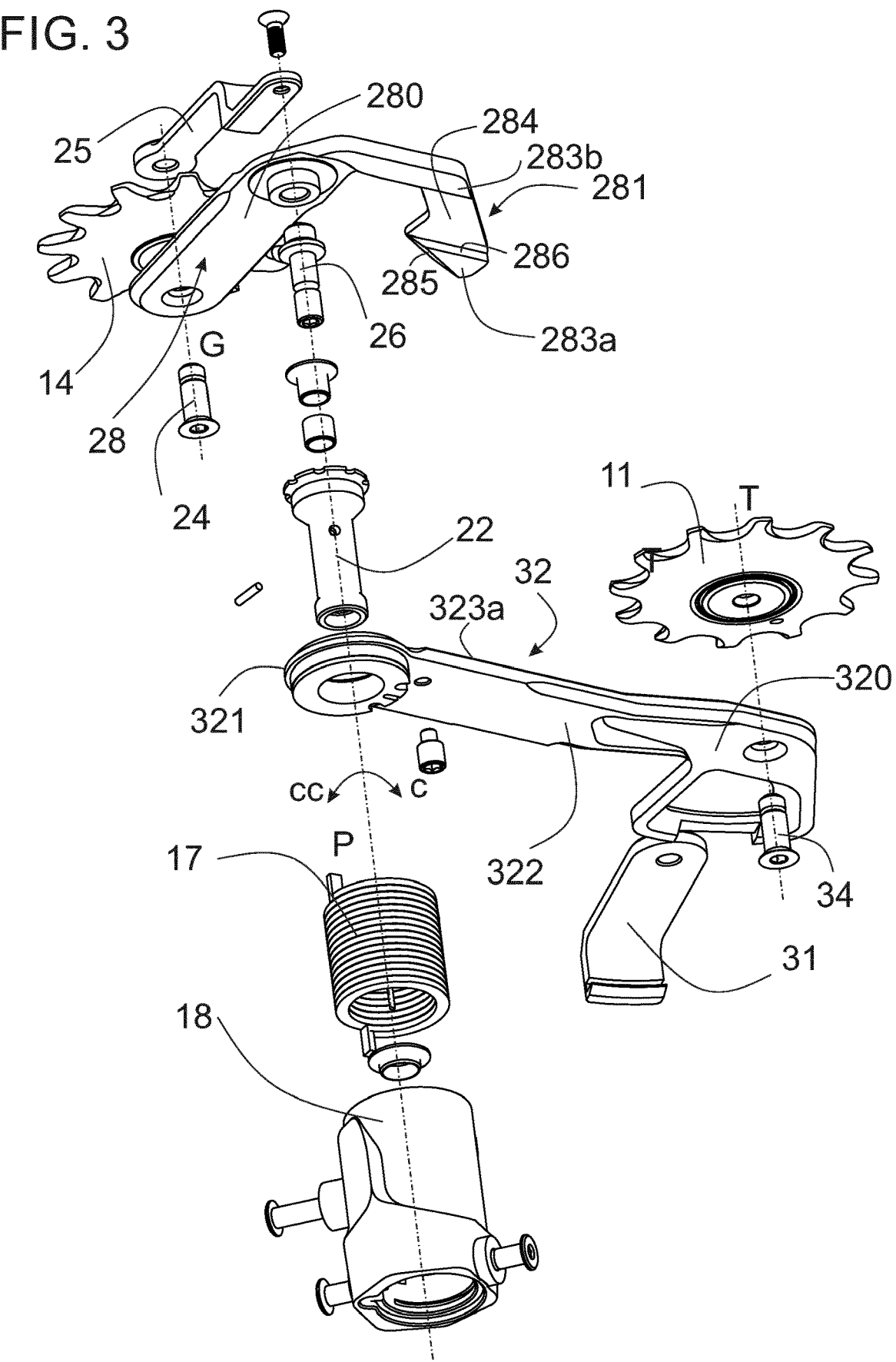
FIG. 3 shows a detailed exploded view of the bicycle rear derailleur device (1) of FIG. 2.

In a preferred embodiment of the present invention, a bicycle rear derailleur device (1) is proposed, comprising: a base member (10) arranged to be anchored to the bicycle frame; a movable member (18); a linking member (13) connecting the base member (10) to the movable member (18), so that said movable member (18) moves laterally relative to the base member (10) between a retracted position and an extended position; a chain guide assembly (15), for guiding a transmission chain by selectively aligning it with one between a plurality of sprockets, comprising two independent chain cages: a tension cage (32) and a guiding cage (28); the tension cage (32) being pivotably coupled to the movable member (18) to be able to rotate about a pivot axis (P) parallel to the rotation axis of the bicycle rear wheel, and provided with a tension pulley (11) that can rotate freely around a tension pulley rotation axis (T) parallel to said pivot axis (P); the guiding cage (28) being provided with a guiding pulley (14) that can rotate freely around a guiding pulley rotation axis (G) parallel to said pivot axis (P), where the guiding cage (28) is movably coupled to the tension cage (32), wherein the distance between the guiding pulley (14) and the tension pulley (11) can vary; and a biasing member (17) provided between the movable member (18) and the tension cage (32) which, in order to keep the chain in tension, forces the tension cage (32) to pivot with respect to the movable member (18) around the pivot axis (P) in the direction of bicycle pedalling rotation (C).

Furthermore, in order to keep the chain aligned, the chain guide assembly (15) disposes the guiding pulley (14) and the tension pulley (11) within the same working plane.

Furthermore, said chain guide assembly (15) comprises coupling means (16) which allow to alternate the configuration of said chain guide assembly (15) in a selective, releasable and reversible way, between at least two operation modes: a maintenance mode and a working mode. Said coupling means (16) can be operated in different ways, for example, manually by the user or automatically.

In the aforementioned maintenance mode, the distance between the guiding pulley (14) and the tension pulley (11) can vary. However, in the working mode, the approach between the guiding cage (28) and the tension cage (32) is prevented, thus limiting the minimum distance between both pulleys (14, 11), so that the guiding cage (28), forced by the tension of the chain, is engaged to the tension cage (32) to move jointly with it.

This two-piece configuration of the chain guide assembly (15) in the present invention, allows different embodiments for the moveable coupling between the two chain cages, via a pivot coupling, sliding, etc. In this preferred embodiment the guiding cage (28) is pivotally coupled to the tension cage (32), and the coupling means (16) are manually actuated and provided between both chain cages. Furthermore, in this pivoting embodiment, both the guiding cage (28) and the tension cage (32) are arranged in the same working plane which contains both the guiding pulley (14) and the tension pulley (11), thus being the 3 main axes parallel to each other: the pivot axis (P), the guiding pulley rotation axis (G) and the tension pulley rotation axis (T).

A second aspect of the present invention includes a bicycle rear derailleur device (1) wherein the coupling means (16) makes the guiding cage (28) become united to the tension cage (32) selectively and reversibly, by fixing the distance between the guiding pulley (14) and the tension pulley (11) in the working mode, so that the coupling means (16) restrict the movement bi-directionally between both chain cages.

Therefore, the chain guide assembly (15) of the present invention can change its configuration using said coupling means (16), between two operation modes:

The working mode, in which the guiding cage (28) and the tension cage (32) are engaged and both move jointly, being fixed the distance between the guiding pulley (14) and the tension pulley (11) thus maximizing the tension in the bicycle chain.

And the maintenance mode, in which the guiding cage (28) is disengaged and moves independently of the tension cage (32), so the distance between the guiding pulley (14) and the tension pulley (11), as it is not restricted, is reduced, causing a chain tension reduction.

Thus, in a preferred embodiment of the invention, the coupling means (16) comprise at least one hook member (281) that engages a receiving member (322), to keep united the guiding cage (28) with the tension cage (32), in order to configure the chain guide assembly (15) in the working mode. On the other hand, when the hook member (281) releases its engagement with the receiving member (322), the guiding cage (28) becomes independent of the tension cage (32), thus configuring the chain guide assembly (15) in the maintenance mode.

Different coupling means (16) embodiment can be made, having as a preferred but not exclusive: one with the hook member (281) arranged either in the tension cage (32) or in the guiding cage (28), wherein the receiving member (322) is respectively arranged in the other component, either in the guiding cage (28) or in the tension cage (32).

Likewise, the releasable coupling between the hook member (281) and the receiving member (322) can be performed by several means, such as by a preloaded spring biasing a unidirectional locking member, or by direct locking between both members fitted in arranged either by unidirectional fitting lock or by bidirectional interlocking. This last is the one shown in the present embodiment.

In a preferred embodiment of the invention, the hook member (281) is configured in the guiding cage (28) and the receiving member (322) is disposed in the tension cage (32). In this configuration, the hook member (281) is arranged as an arm which is capable of elastic deformation for going out of its working plane, when it is manually operated by the user to switch between the operation modes of the chain guide assembly (15). Said hook member (281) comprises a hook protrusion (283a) with a locking surface (286). And said receiving member (322) comprises a pulling surface (323b) which engages with said locking surface (286), allowing a unidirectional locking between the hook member (281) and the receiving member (322). Thus, the guiding cage (28) rotation with respect to the tension cage (32) is restricted in the opposite to the pedalling direction (CC). In order to achieve said lock, the locking surface (286) is configured with an angle less than 90° with respect to the aforementioned working plane.

In another aspect of the present invention, said hook member (281) further comprises a secondary protrusion (283b) including a fitting surface (287). This fitting surface (287) together with the hook protrusion (283a) form a fitting recess (284). The receiving member (322) further comprises a blocking surface (325) that couples to the fitting surface (287), causing a bidirectional interlocking between the receiving member (322) and the fitting recess (284), thereby making the hook member (281) be united with the receiving member (322).

This hook member (281) is preferably configured arm-shaped having a ratio between longitudinal and cross-sectional dimensions that facilitates its displacement outside from its working plane, either by bending or twisting the arm, or by the combination of both effects. In this preferred embodiment, the geometric configuration of the arm has a cross-section in which thickness is much smaller than the height, thus facilitating the elastic bending of the arm. This geometrical configuration allows the hook member (281) to be elastically deformed thus moving out of its working plane to overcome the receiving member (322), in order to engage or disengage with it.

We will now describe the operation of said coupling means (16), which make the change between both operation modes.

Figure 7:
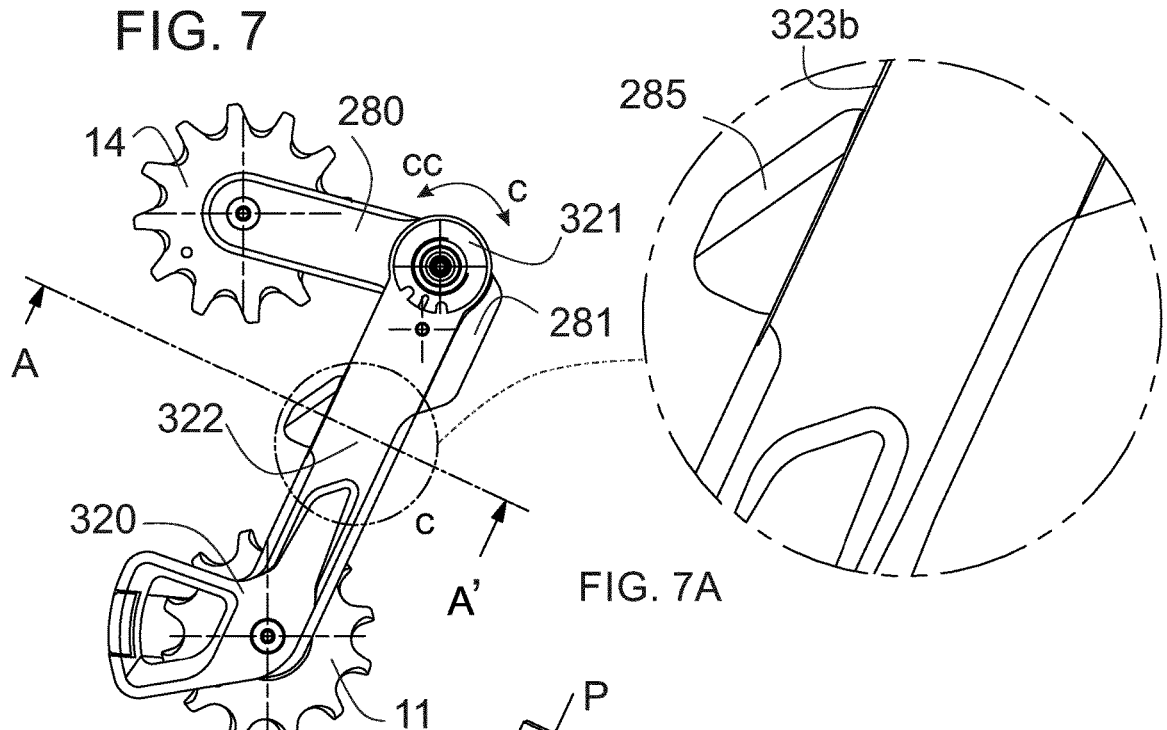
FIG. 7 shows a section A-A' detail in the working position shown in FIG. 4A, with the hook member (281) engaged in the receiving member (322).
Figure 7A:
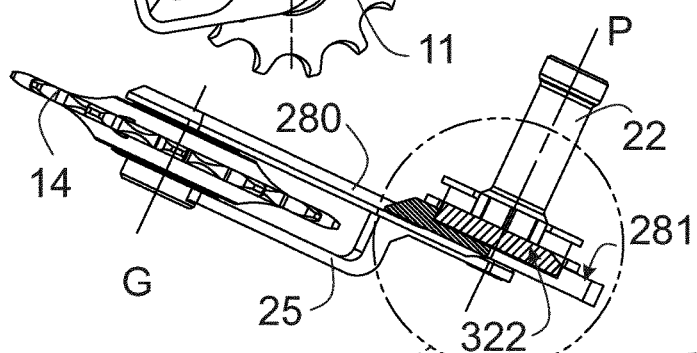
Figure 7B:
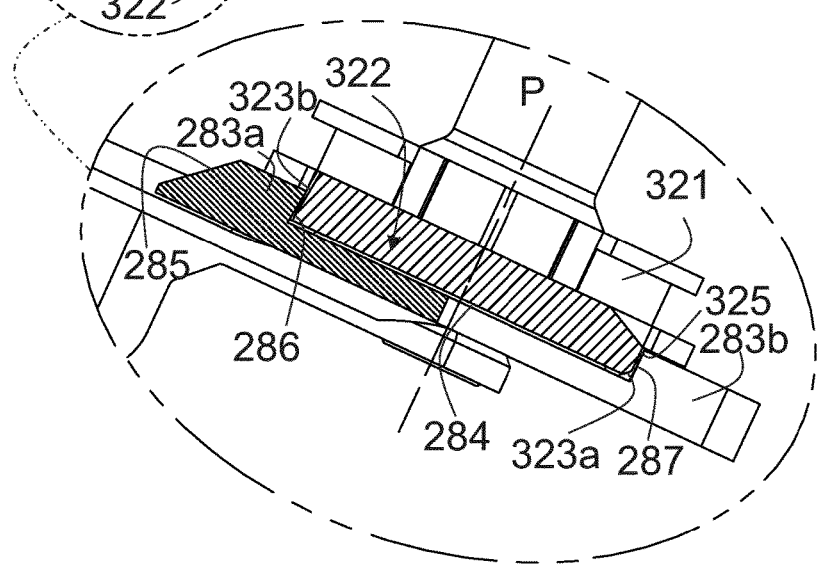
Figure 8:
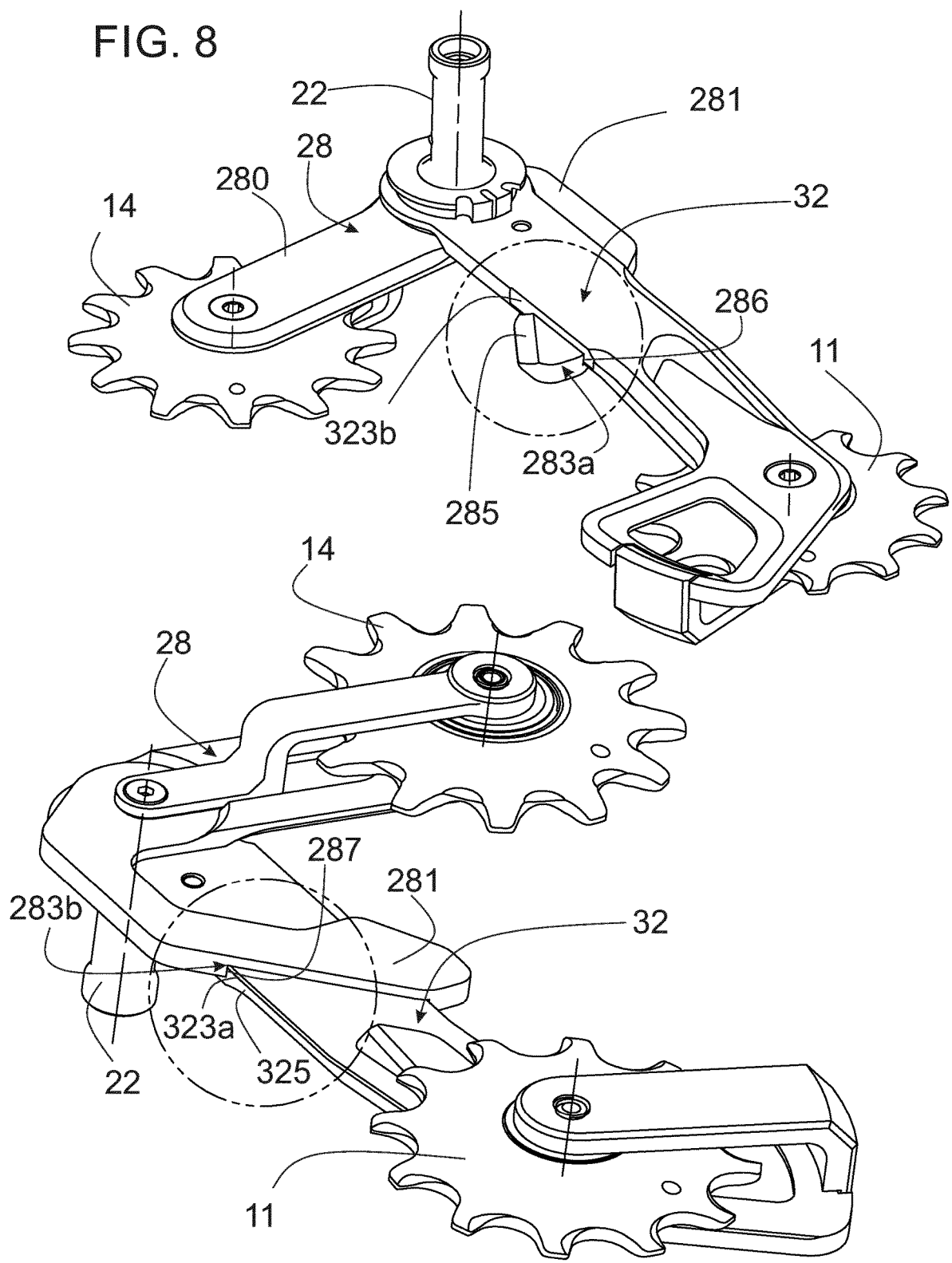
FIG. 8 shows two perspective views disclosing the coupling area in the working mode shown in FIG. 4A, with the hook member (281) engaged in the receiving member (322). It shows the hook protrusion (283a) comprising a sliding slope (285), and the entry slope (323a) of the receiving member (322). It is also disclosed the pulling surface (323b) of the receiving member (322) interlocked with the locking surface (286) of the hook member (281). We can see as well, the secondary protrusion (283b) that produces the bidirectional interlocking between the receiving member (322) and the hook protrusion (283a).
Figure 9:
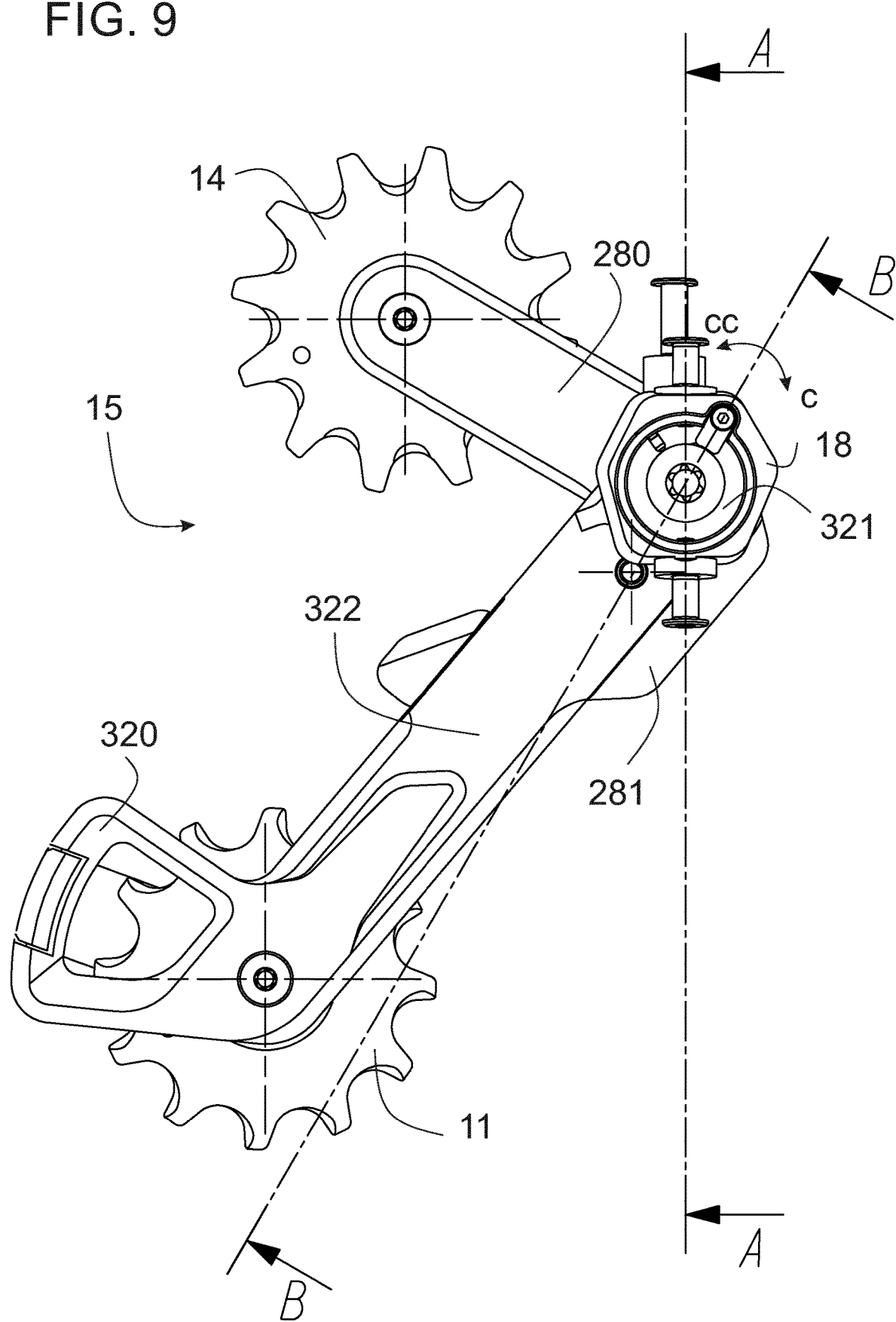
FIG. 9 shows a side view of the movable member (18) and the chain guide assembly (15) disposed in the working mode.
Figure 10:
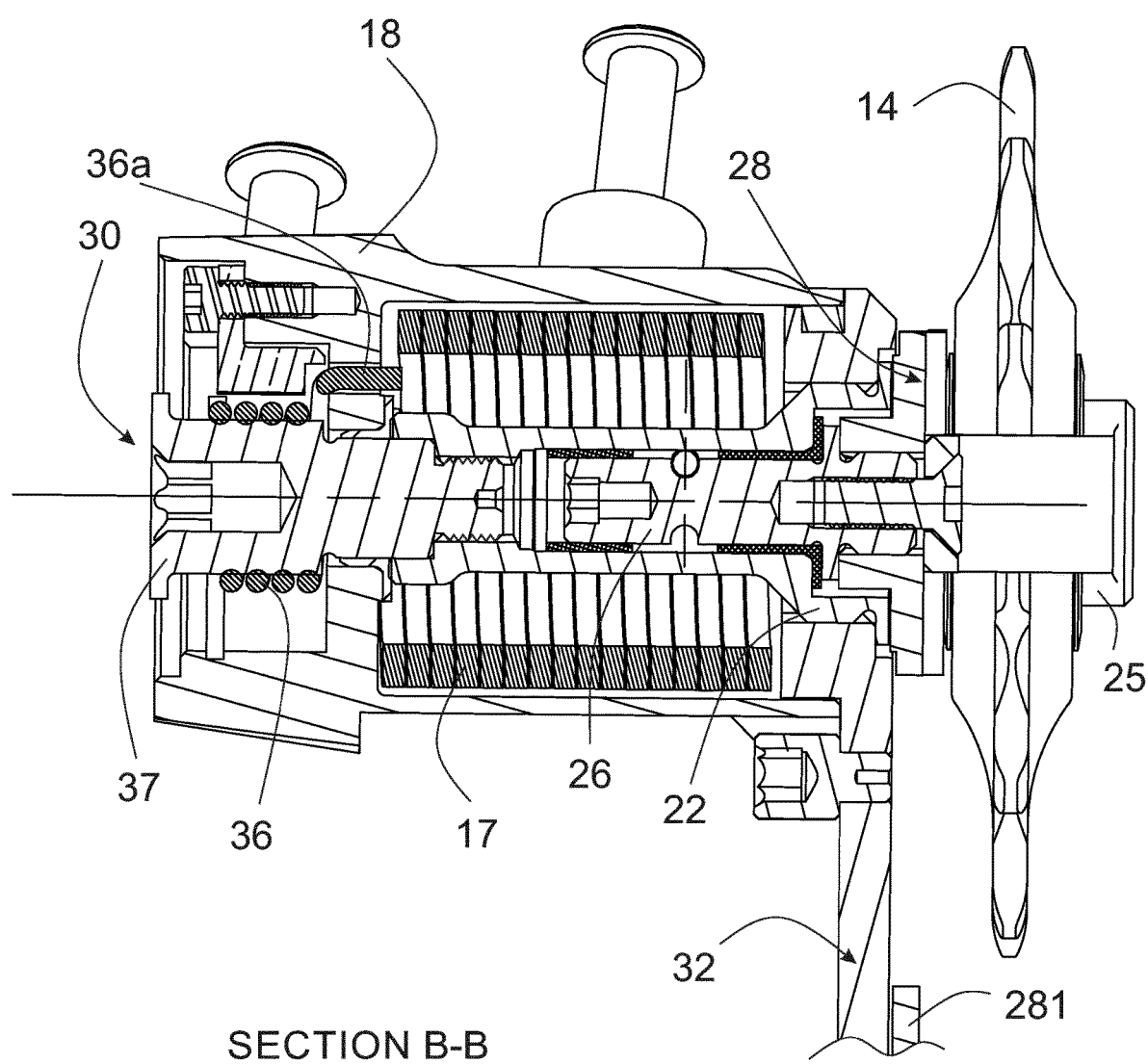
FIG. 10 shows the section B-B disclosing the movable member (18) internally of FIG. 9, comprising a unidirectional resistance mechanism (30) housed in the movable member (18) and coupled to the tension cage (32), wherein the unidirectional resistance mechanism (30) changes the resistance to move of the tension cage (32) according to rotate in a first rotating direction, or in a second rotating direction.
Figure 11:
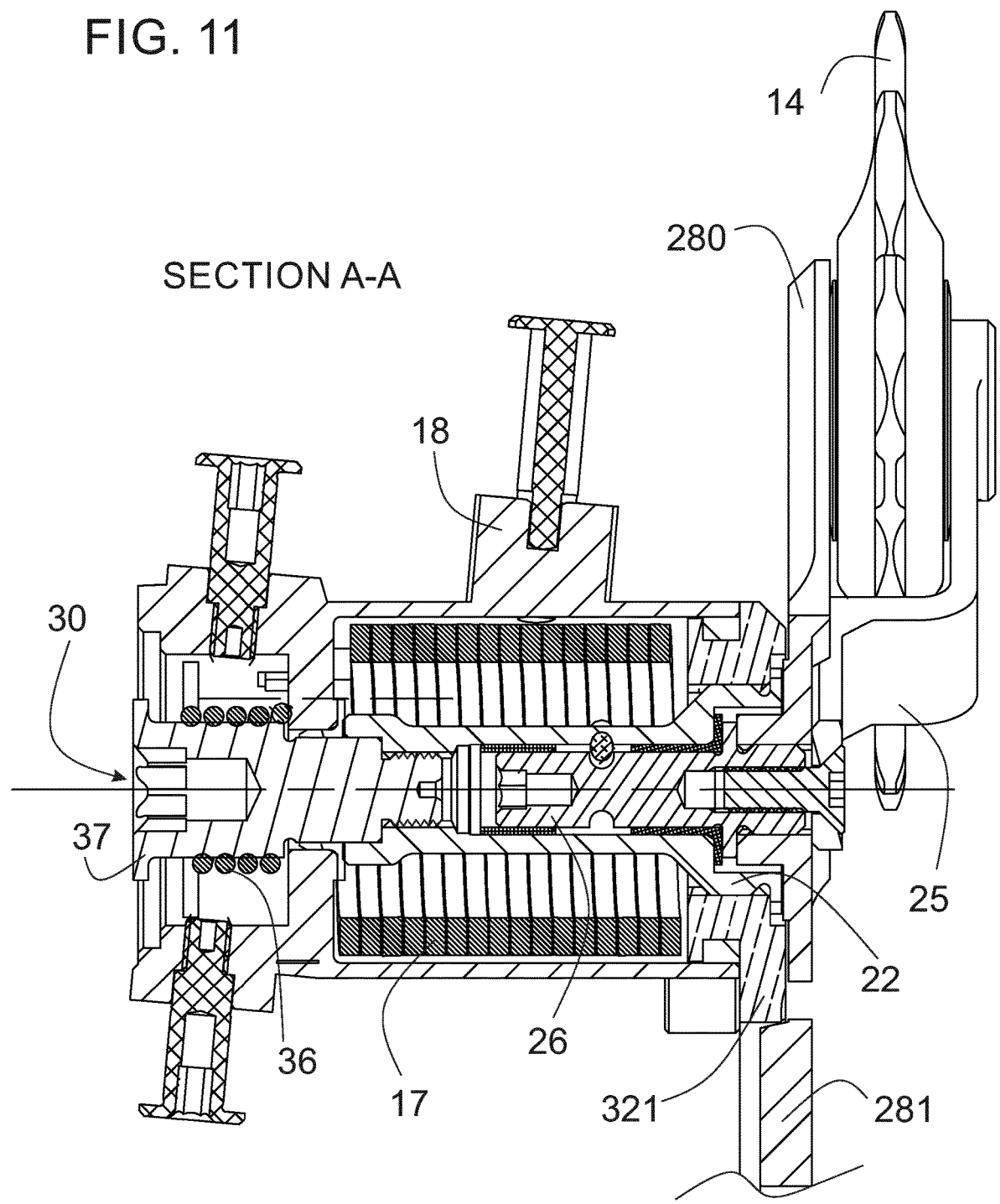
FIG. 11 shows the section A-A disclosing the movable member (18) internally of FIG. 9, comprising the unidirectional resistance mechanism (30), formed by a friction member (37) arranged united with the rotation shaft of the tension cage (22), and a resistance member (36) configured as a wound wire around the friction member (37) to brake its rotation in the counter clockwise (CC) rotating direction, during the rotation of the tension cage (32) in relation to the movable member (18).

Initially, the bicycle rear derailleur device (1) is configured in the working mode, where the tension cage (32) and the guiding cage (28) are coupled and moving jointly, maintaining the chain tension in the requested values for its proper function. This working mode is shown in FIGS. 7 and 8, disclosing the pulling surface (323b) of the receiving member (322) in contact with the locking surface (286) of the hook member (281). It is also shown the secondary protrusion (283b), including a fitting surface (287) which is coupled with the blocking surface (325) of the receiving member (322), thus bidirectionally engaging the hook member (281) with the receiving member (322), and consequently making them united.

When requiring to perform maintenance operations, the user applies a force perpendicular to the working plane in the direction towards the bicycle, preferably by pressing with one finger in the area of the hook protrusion (283a) located at the end of the hook member (281). Due to the elastic ability of the hook member (281), said hook member (281) moves out of its working plane, causing the sliding between the locking surface (286) and the pulling surface (323b), thus releasing the engagement between both members (281, 322). As a consequence of the existing chain tension, a relative displacement between both chain cages happens, approaching the guide pulley (14) and the tension pulley (11) to each other, thus switching to maintenance mode.

Once the maintenance operations have been finished, in order to reconfigure the rear derailleur (1) in working mode, the user forces the approach between the hook member (281) and the tension cage (32), preferably clamping both elements with one hand, so the guiding cage (28) pivots relative to the tension cage (32) in the clockwise direction C, until the hook member (281) comes into contact with the receiving member (322), shown in FIG. 6. This is the moment when the sliding slope (285) and the entry slope (323a) come into contact, forcing the bending of the hook member (281) and allowing the hook protrusion (283a) to continue its advance, overlapping and surpassing the receiving member (322) until both are engaged by interlocking in the working mode.

A third aspect of the present invention includes a bicycle rear derailleur device (1) comprising a unidirectional resistance mechanism (30) disposed between the movable member (18) and the chain guide assembly (15) to restrict the relative rotation of the chain guide assembly (15) with respect to the movable member (18) in one of the rotating directions, preferably in the opposite to pedalling direction (CC). This unidirectional resistance mechanism (30) is coupled to the tension cage (32) for applying resistance to the movement of said tension cage (32), without the user acts on said unidirectional resistance mechanism (30), and it comprises a friction member (37) united to the chain guide assembly (15), preferably integral with the rotation shaft of the tension cage (22), and a resistance member (36) coupled to the movable member (18) which brakes the rotation of said friction member (37) in one of the of rotating directions (CC), during the rotation of the chain guide assembly (15) with respect to the movable member (18).

In a preferred embodiment of the unidirectional resistance mechanism (30), the friction member (37) is configured as a shaft in one piece with the chain guide assembly (15), and the resistance member (36) is configured as a wire having one of its ends, named resistance anchor member (36a), anchored in the movable member (18) and being the other end free. Said wire is coiled in the opposite to the bicycle pedalling direction (CC), when starting from said resistance anchor member (36a), thus forming coils around said friction member (37), so that when the friction member (37) rotates in the opposite to the bicycle pedalling direction (CC), the coils embrace tightly said friction member (37) increasing its resistance to rotate, while in the opposite rotating direction, corresponding to the pedalling direction (C), the coils opens decreasing the resistance to rotation of the friction member (37).

Alternative Embodiments

An alternative embodiment of the present invention is a bicycle rear derailleur device (1) where the guiding cage (28) is slidably coupled, by means of a sliding system or similar, to the tension cage (32). In this embodiment, the coupling means (16) are manually operated and provided between both chain cages, to selectively and reversibly switch to coupling or uncoupling mode between the guiding cage (28) and the tension cage (32), that is to say, between a position wherein both chain cages are united in the working mode, and an uncoupled position of the guiding cage (28) with respect to the tension cage (32) in the maintenance mode.

In another embodiment of the present invention, the bicycle rear derailleur device (1) further comprises a positioning mechanism (100), for aligning the working plane of the chain with each of the different sprockets, defining and maintaining in a releasably way the movable member (18) in a plurality of corresponding positions. Preferably, this positioning mechanism (100) is connected to the linking member (13), and it is selectively driven by a slave connector, preferably unidirectional or single-acting connector member. This positioning mechanism (100) can be one of those already known in the Prior Art, being possible configure it by a ratchet indexer, servo-motor or other types, and being operated by various known drive means, cable, electronically, by fluid, etc.

While the above is a description of different embodiments of the present invention, other modifications may be used without going beyond the scope of the present invention as defined by the attached claims. For example, the size, shape, location or orientation of the several components can be changed as desired. The components shown directly connected or in contact with each other may have intermediate structures disposed there between. The functions of an element can be performed by two different elements, and vice versa. Therefore, the scope of the invention should not be limited by the specific embodiments described.

The invention claimed is:

1. Bicycle rear derailleur device (1), comprising:
   a base member (10) arranged to be anchored to the bicycle frame; a movable member (18); a linking member (13) connecting the base member (10) to the movable member (18), so that said movable member (18) moves laterally relative to the base member (10) between a retracted position and an extended position;
   a chain guide assembly (15), for guiding a transmission chain by selectively aligning it with one between a plurality of sprockets, comprising two independent chain cages: a tension cage (32) and a guiding cage (28); the tension cage (32) being pivotably coupled to the movable member (18) to be able to rotate about a pivot axis (P), and provided with a tension pulley (11) that can rotate freely around a tension pulley rotation axis (T) parallel to said pivot axis (P); the guiding cage (28) being provided with a guiding pulley (14) that can rotate freely around a guiding pulley rotation axis (G) parallel to said pivot axis (P), where the guiding cage (28) is movably coupled to the tension cage (32), wherein the distance between the guiding pulley (14) and the tension pulley (11) can vary;
   and a biasing member (17) provided between the movable member (18) and the tension cage (32) which, in order to keep the chain in tension, forces the tension cage (32) to pivot with respect to the movable member (18) around the pivot axis (P) in the direction of bicycle pedalling rotation (C);
   characterized in that said chain guide assembly (15) comprises coupling means (16), which allow to alternate the configuration of said chain guide assembly (15) in a selective and reversible way, between at least two operation modes, a maintenance mode wherein the distance between the guiding pulley (14) and the tension pulley (11) can vary; and a working mode wherein the approach between the guiding cage (28) and the tension cage (32) is prevented, thus limiting the minimum distance between the guiding pulley (14) and the tension pulley (11), so that the guiding cage (28) forced by the tension in the chain, moves jointly with the tension cage (32).

2. Bicycle rear derailleur device (1) according to claim 1, wherein the coupling means (16) makes the guiding cage (28) become united to the tension cage (32) selectively and reversibly, by fixing the distance between the guiding pulley (14) and the tension pulley (11).

3. Bicycle rear derailleur device (1) according to claim 1, wherein the guiding cage (28) is pivotally coupled to the tension cage (32), and the coupling means (16) are manually operated and provided between both chain cages.

4. Bicycle rear derailleur device (1) according to claim 3, wherein the coupling means (16) comprise at least one hook member (281) that selectively and reversible engages a receiving member (322), to keep united or release the guiding cage (28) with the tension cage (32).

5. Bicycle rear derailleur device (1) according to claim 4, wherein the hook member (281) is arranged either in the tension cage (32) or in the guiding cage (28), being the receiving member (322) respectively arranged in the other component, either in the guiding cage (28) or in the tension cage (32).

6. Bicycle rear derailleur device (1) according to claim 4, wherein the coupling between the hook member (281) and the receiving member (322) is made by a preloaded spring biasing a unidirectional locking member.

7. Bicycle rear derailleur device (1) according to claim 5, wherein the coupling between the hook member (281) and the receiving member (322) is made by direct locking between them.

8. Bicycle rear derailleur device (1) according to claim 7, wherein the hook member (281) is arranged as an arm which is capable of elastic deformation for going out of its working plane, when it is manually operated by the user to switch between the operation modes of the chain guide assembly (15), comprising a hook protrusion (283*a*) with a locking surface (286); and wherein the receiving member (322) comprises a pulling surface (323*b*) which engages with said locking surface (286), allowing a unidirectional fitting lock between the hook member (281) and the receiving member (322).

9. Bicycle rear derailleur device (1) according to claim 8, wherein the hook member (281) further comprises a secondary protrusion (283*b*) including a fitting surface (287) which together with the hook protrusion (283*a*) form a fitting recess (284), and wherein the receiving member (322) further comprises a blocking surface (325) that couples to the fitting surface (287), causing a bidirectional interlocking between the receiving member (322) and the fitting recess (284), thereby making the hook member (281) be united with the receiving member (322).

10. Bicycle rear derailleur device (1) according to claim 7, wherein the hook member (281) is configured in the guiding cage (28) and the receiving member (322) is disposed in the tension cage (32).

11. Bicycle rear derailleur device (1) according to claim 10, further comprising a positioning mechanism (100), connected to the linking member (13), which defines and releasably maintains the movable member (18) in a plurality of predetermined working positions.

12. Bicycle rear derailleur device (1) according to claim 11, further comprising a unidirectional resistance mechanism (30) disposed between the movable member (18) and the chain guide assembly (15) to restrict the relative rotation of the chain guide assembly (15) with respect to the movable member (18) in one of the rotating directions, preferably in the opposite to pedalling direction (CC).

13. Bicycle rear derailleur device (1) according to claim 12, wherein the unidirectional resistance mechanism (30) is coupled to the tension cage (32) for applying resistance to the movement of said tension cage (32) without the user acts on said unidirectional resistance mechanism (30).

14. Bicycle rear derailleur device (1) according to claim 12, wherein the unidirectional resistance mechanism (30) comprises a friction member (37) united to the chain guide assembly (15), preferably integral with the rotation shaft of the tension cage (22), and a resistance member (36) coupled to the movable member (18) which brakes the rotation of said friction member (37) in one of the of rotating directions (CC), during the rotation of the chain guide assembly (15) with respect to the movable member (18).

\* \* \* \* \*